(12) United States Patent
Ellingson et al.

(10) Patent No.: US 7,220,127 B2
(45) Date of Patent: May 22, 2007

(54) HEART MODEL

(75) Inventors: Elizabeth A. Ellingson, Eden Prairie, MN (US); Gregory A. Boser, Richfield, MN (US); David L. Miller, Circle Pines, MN (US); Ryan P. Lahm, Blaine, MN (US); Jill A. Lafavor, Minnetonka, MN (US); Mandy L. Rasmussen, Minneapolis, MN (US); Sonar Shah, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 297 days.

(21) Appl. No.: 10/763,604

(22) Filed: Jan. 22, 2004

(65) Prior Publication Data

US 2005/0130107 A1    Jun. 16, 2005

Related U.S. Application Data

(60) Provisional application No. 60/529,680, filed on Dec. 15, 2003.

(51) Int. Cl.
 *G09B 23/28* (2006.01)
(52) U.S. Cl. ............... 434/272; 434/268; 434/265; 434/262
(58) Field of Classification Search .......... 434/272, 434/268, 265, 262
See application file for complete search history.

(56) References Cited

U.S. PATENT DOCUMENTS

| 2,076,782 | A | * | 4/1937 | Jedlicka | 362/412 |
| 2,743,834 | A | * | 5/1956 | Williams | 215/354 |
| 5,482,472 | A | * | 1/1996 | Garoni et al. | 434/272 |
| 6,141,576 | A | * | 10/2000 | Littmann et al. | 600/381 |
| 6,234,804 | B1 | * | 5/2001 | Yong | 434/267 |
| D459,215 | S | * | 6/2002 | Buboltz et al. | D9/629 |
| 6,685,481 | B2 | * | 2/2004 | Chamberlain | 434/272 |
| 2004/0249312 | A1 | * | 12/2004 | Gardeski et al. | 600/585 |

OTHER PUBLICATIONS

Anatomical's Deluxe Heart Model, Internet—http://www.lww.com/browsemediaspec/Model/0,0,6,00.html, 2006.*
Guidant Corporation, website, "Frequently Asked Questions—Solution," http://www.stanford.edu/class/me282/Guidant%20Web page/solution.html; p. 1-2, printed Dec. 12, 2003.

* cited by examiner

*Primary Examiner*—Eugene Kim
*Assistant Examiner*—Urszula M Cegielnik
(74) *Attorney, Agent, or Firm*—Daniel G. Chapik; Paul H. McDowall; Girma Wolde-Michael

(57) ABSTRACT

A heart model provides a simulative environment for lead implantation and affixation. In one embodiment, removable silicone plugs are provided at appropriate locations so that an inserted lead can be affixed to the plugs with a helical tip. A simulative venous structure is provided that has increased lubricity to facilitate the insertion and manipulation of the lead.

12 Claims, 2 Drawing Sheets

HEART MODEL

RELATED APPLICATION

This application is related to, and claims the benefit of, provisionally-filed U.S. Patent Application Ser. No. 60/529,680, filed Dec. 15, 2003, and entitled "Heart Model", which is incorporated herein by reference in its entirety.

FIELD OF THE INVENTION

The present invention relates to anatomical modeling. More specifically, the present invention relates to cardiac modeling.

DESCRIPTION OF THE RELATED ART

Basic human anatomy is relatively well understood. The anatomy of fundamental organs such as the heart and the cardiac venous/arterial structure (collectively cardiac anatomy) has been defined with a fair degree of precision for some time. Such an understanding is classically derived from dissection and direct observation of specimens, with the resultant data rendered in two-dimensional representations, such as drawings, sketches, or photographs. Newer technologies, such as MRI, CRT, PET, CAT and the like have provided tools for imaging cardiac anatomy in subjects with a high degree of precision. Even in such cases, the resultant data is viewed in a two dimensional form (e.g., displayed on an electronic monitor, printed on a substrate). Computerized modeling allows for simulated three dimensional rendering; however, this is still ultimately a complex series of selectively displayed two dimensional representations.

True three dimensional modeling of cardiac anatomy is surprisingly sparse. For purposes of direct observation and tangible manipulation for education and training, an actual human heart may be harvested from a cadaver. For many reasons, this is a very limited option. Availability is limited and a heart so obtained is useful for only a short period of time before deteriorating from natural breakdown and/or physical handling.

Techniques are now available to plasticize human tissue and have been used to generate plasticized human hearts. Such a plasticized heart is extremely accurate in many physical aspects such as size, shape, and configuration. The resultant texture is rigid as the tissue has been solidified.

Typical fabricated training or educational models are gross approximations based on artistic rendering. These models may show, for example, the entire exterior of the heart or a portion thereof. They may include hinged portions or sectional covers that when actuated, expose interior portions of the anatomy. These models provide a training aide that is useful for many applications, but does not provide a life-like approximation.

In many training or educational situations, these models fail to provide the appropriate environment or context. For example, various implantable medical devices (IMD) include leads that are guided through a vein, into the heart, and then positioned and/or affixed at a desired location. In actual practice, such implantation is done with limited visual information. For example, a fluoroscope may be used to image the lead as it is manipulated and contrasting dye may be provided to better define the soft tissue, which is otherwise difficult to observe. A sense of touch and an understanding of the anatomy are also relied on by the practitioner.

Because of the unique environment and characteristics of lead implantation, the above noted cardiac models are insufficient in that they do not allow a practitioner to manipulate a lead in the same physical environment present in a living patient. The ability to do so would benefit medical practitioners who are learning techniques and as well as device manufactures who need to asses their own products and then demonstrate those products to the medical community.

In one lead demonstration device, rigid plastic tubes are coupled with a rigid plastic chamber that roughly approximates the size of a heart. The tubes represent but dot not simulate or approximate, for example, the subclavian vein that provides a pathway into the right ventricle. A lead may be forced through the tubing and into the chamber. This device provides a good training aid in that it visually demonstrates the general pathway taken and an approximate resultant lead position within the heart. It also is a tool used to demonstrate the implant procedure and process steps.

This configuration does not provide an accurate representation of the implantation environment. The plastic tubing provides a frictional barrier and severely hinders and even precludes the advancement of a lead. Any curvature of the tube increases this problem. Thus, lead advancement cannot be accurately simulated. The device also lacks any physical representation of anatomical structure within the heart and does not permit lead affixation.

In another teaching aid, interior portions of the heart and some portion of the venous anatomy are molded within a rigid, silicone block. Valves are added and fluid flow is generated to simulate cardiac output. This model provides a relatively accurate representation of the internal structure and topography of the heart, but leads can not be affixed to the stiff silicone, and visibility through the model is impaired.

Such models fail to provide for an accurate representation of the physical characteristics associated with lead implantation and affixation while still providing a meaningful teaching and training environment (e.g., allowing for appropriate visibility, lead insertion/advancement, affixation, etc.). Natural cardiac anatomy provides for a tortuous and complex navigation pathway that makes guidance and steering an issue, yet because of the lubricity of the fluid environment and the nature of the tissue lead movement itself is facilitated and presents a unique context. Likewise, once within a given heart chamber, there is complex topography and navigation issues (e.g., identifying and entering the coronary sinus, passing through a valve, identifying an affixation site, etc.). Thus, the above models do not provide a comprehensive representative environment for simulating lead implantation and affixation.

BRIEF SUMMARY OF THE INVENTION

The present invention, in one embodiment, is a heart model comprising a structure defining at least one cardiac chamber. The model also includes an affixation surface defining a portion of the heart structure, wherein the affixation surface is formed from a material that permits lead affixation.

In another embodiment, the present invention is a heart model, comprising means to simulate cardiac anatomy. The model also includes means to define a lead implantation pathway and means to simulate lead affixation.

The present invention also includes a method of making a heart model, comprising obtaining three dimensional data representative of a human heart. The method further includes fabricating a stereo lithographic rendering of the three dimensional data, generating a model from the rendering, removing a portion of the model, and replacing the removed portion with a low durometer material capable of receiving a helix of a cardiac lead.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
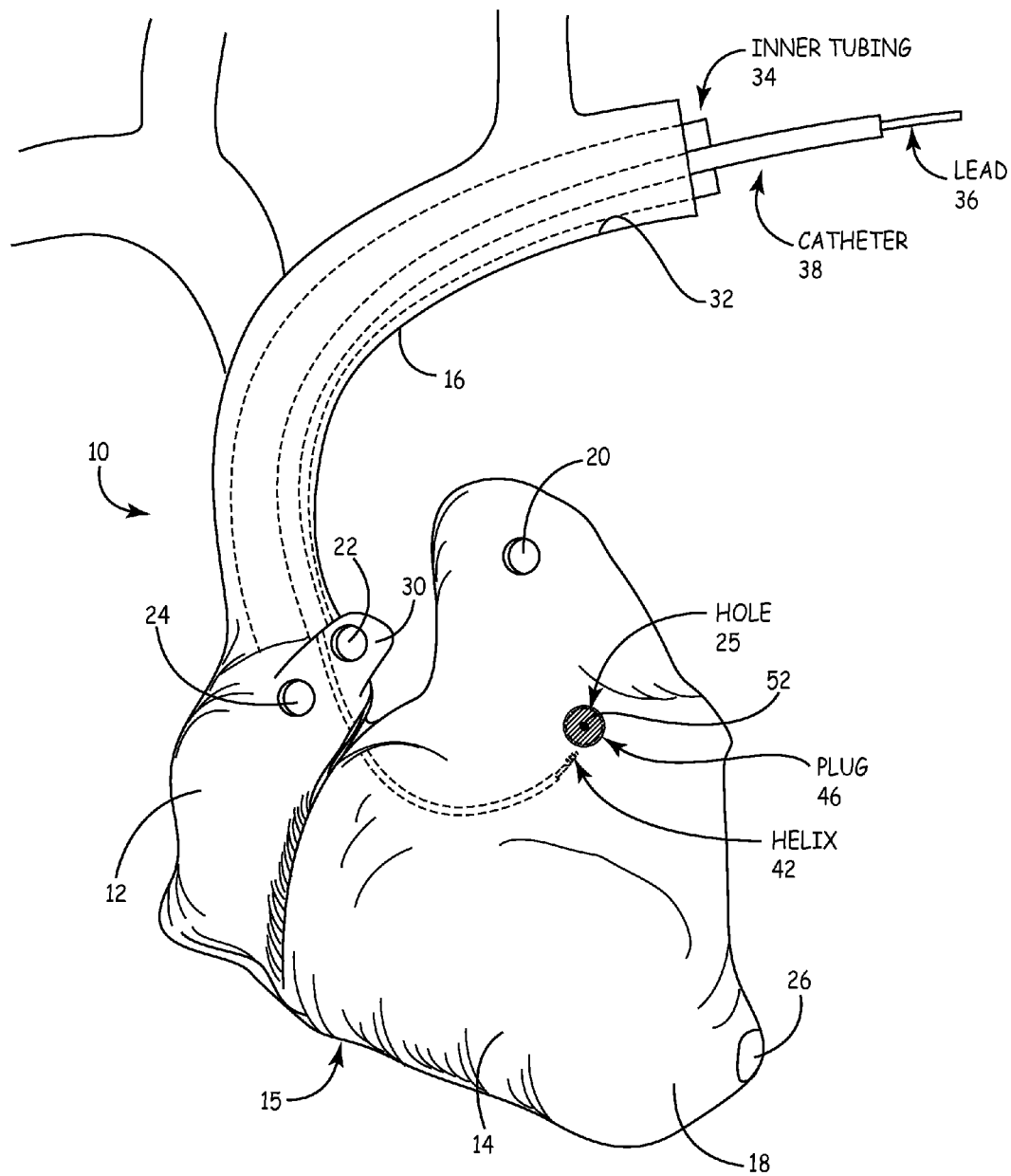
FIG. 1 is an isometric view of a heart model consistent with the principles of the present invention.

Referring to FIG. 1, a heart model 10 is illustrated, consistent with the principles of the present invention. Heart model 10 is a generally rigid structure that includes various anatomical cavities including a right atrial chamber 12 and right ventricular chamber 14. A portion of the venous anatomy includes a vein 16 representative of the superior vena cava. The vein 16 is generally rigid, having a passageway defined therethrough that is in communication with the right atrial chamber 12.

The extent of the cardiac anatomy and the accuracy of the heart model 10 can be varied depending upon the desired training, educational, or other intended purposed. For example, the entire heart including both atria and both ventricles may be included. Alternatively, only the left side of the heart, only the right side of the heart, or any portion thereof may be modeled, to reduce complexity for specific applications. In addition, any or all of the naturally occuring veins and arteries connected to or present on the heart may be represented. The length to which the modeled veins (e.g., vein 16) or arteries extend from the heart structure 15 is also variable. For example, one illustrative use of the heart model 10 is lead insertion. Thus, the venous structure modeled may be as extensive as that encountered in human anatomy. Some electrophysiological manipulation requires insertion and advancement of instruments through the femoral artery; thus, distances of several feet are utilized. In such an application, representations of the aortic arch and descending aorta may be provided. Typical lead implantation involves accessing through the subclavian vein and lengths of 5–25 inches would be representative. In any event, the modeled length of the vein 16 is variable.

The heart model 10 is constructed from a suitable material, for example, plastic, that allows physical handling and manipulation while retaining its integrity. Suitable materials include urethane, silicone, silicone gel, or various other elastomers that provide adequate strength and rigidity. In one embodiment, the heart model 10 is completely transparent, allowing complete visualization of the interior portions. In other embodiments, the entirety of heart model 10 or portions thereof are partially or fully occluded.

The heart model 10 can be fabricated with different degrees of anatomical accuracy. In one embodiment, heart model 10 is fabricated with a high degree of anatomical accuracy. Accurate modeling data from a human heart is obtained from, for example, MRI scans. That data is then used to generate a three dimensional plastic rendering via sterolithography. The rendering is then either used as the final heart model 10 or used to fabricate a mold and the heart model 10 is then made from that mold. In this manner, all or a portion of the heart model 10 can be made as a highly accurate representation of the cardiac anatomy. The interior and/or the exterior portions may be independently varied in detail, depending upon the intended application. For example, for a more extensive simulation, all interior features and topography are modeled. Relevant structures may be provided including, for example, the various valves, the septum, and the coronary sinus with or without veins or arteries extending some distance therefrom. In other embodiments, the generalized identification of fixation point locations may be the primary focus; thus, less interior detail might be provided. The exterior detail provides contextual and positional reference for the user even though such detail will not affect the lead manipulation within the interior of the heart model 10. Thus, the level of such exterior detail may be varied and selected accordingly.

As previously indicated, one use of heart model 10 is to illustrate lead implantation. As such, a lead 36 may be inserted through the vein 16 into the heart structure 15. This may be used to simulate lead insertion, lead steering and/or manipulation, lead extraction, catheter manipulation (e.g., slitting with a lead present), lead placement within the heart, and lead affixation among other things.

To facilitate lead placement within the heart structure 15, various points of interest within the heart may be identified, such as for example, the apex 18 (a common lead affixation point) or the right atrial appendage 30 (an alternative affixation point) Such identification may include simple markings or colored areas to illustrate their position. Alternatively, one or more holes 20, 22, 24, 25, 26 are disposed in the heart structure 15. As will be described in greater detail, a plug 46 formed from silicone or another suitable material, is inserted into a given hole 25 and provides a medium to which a lead 36 can actually be affixed.

The heart model 10 may be made from a rigid material such as plastic that is not particularly conducive to lead movement, particularly in restricted and/or tortuous areas such as the vein 16. As such, an inner tubing 34 is provided within heart vein 16. Inner tubing 34 may be a separate component added subsequent to fabrication that abuts the interior wall 32 of the vein 16. Alternatively, inner tubing may be a coating or a material that is applied to the interior wall 32 during or after manufacture.

The inner tubing 34 has a lubricious characteristic that reduces friction and thus facilitates the advancement, retraction and manipulation of the lead 36 and/or catheter 38. The inner tubing 34 in one embodiment, is a flexible sheathing of EPTFE (expanded polytetrafluoroethylene). In other embodiments, inner tubing 34 is made of polyurethane, lubricous silicone, expandable rubber coated fiberglass, vinyl coated fiberglass, or other lubricious polymer materials. Alternatively, these materials may be applied as a coating to the inner sleeve 32. Other coating material includes silicone oils or sprays, hydrogels, polyacrylamide, or parylene. Any suitable material may be selected so long as the desired degree of lubricity is achieved.

The heart model 10 can be utilized while submerged in a liquid or may be filled with liquid to simulate the presence of blood. Such liquids may include, for example, water, mineral oil, or water based lubricants. In many embodiments, clear liquid will be utilized to permit visibility; however, if visibility is not critical in a given application virtually any liquid may be selected. As such, the inner tubing 34 should be selected to be compatible with a given liquid, if utilized. In addition, the fluid may be pumped to simulate pulsitile flow. In such a case, the various anatomical components, e.g., the septum and outer wall, may be modeled with accurate thickness and/or accurate levels of flexibility so as to respond in a realistic simulative manner to such pulsitile flow.

As mentioned, the inner tubing 34 may be a separate sleeve that is inserted into the vein 16 or may be coating, film, or integral component applied to or manufactured as a part of the inner wall 32. In either case, lubricity is enhanced to facilitate lead movement. Other physicals parameters encountered in actual implantations can be simulated by adding liquid and even simulating the pulsitile flow of that liquid. The flexible resistance of a vein or arterial wall can also be simulated in a number of ways. For example, if the inner tubing 34 is a separate, flexible sleeve having an appropriate inner diameter, the sleeve will tend to "grip" or compress around the lead 36 or catheter 38 that is inserted therein. That is, the nature of the material is lubricious and reduces friction, but the flexibility of the sleeve and it tortuous configuration provides some degree of constriction that simulates the natural resistance that is perceived in actual implantations. Other material added to the vein 16 having the appropriate degree of lubricity, resilience, and sizing can also approximate these characteristics.

The inner tubing 34 is provided within all or a portion of the vein 16. Typically, the interior of the heart structure 15 has ample room to facilitate lead manipulation and movement. Thus, the inner tubing 34 need not extend into the heart structure 15. In addition, if the inner tubing 34 takes the form of a sleeve, extension through the heart structure 15 would limit the path of the lead 36. This may be desirable to illustrate one discreet path for a given procedure; however, in most embodiments such sheathing will not be extended in any significant amount into the heart structure 15 so that full movement is permissible therein. If additional lubricity within the heart structure 15 is desired, the above material be applied as a coating, film or fabricated into the material of the model 10. Of course, in either the vein 16 or heart structure 15, material can be applied in any amount on a per use basis. For example, silicone oil can be applied before a given use.

The inner tubing 34, in one embodiment, is formed from a transparent material so that full visibility of the lead/catheter is permitted. In other embodiments, the material is partially or fully opaque. Visibility within the vein 16 is not a requirement in many embodiments.

The heart model 10 may be used to illustrate, teach, train or practice any number of cardiac procedures. As illustrated, the lead 36 is guided through a catheter 38, as is well known. Alternatively, a guidewire may be employed or a stylet may be inserted within a lead. Other tools or objects may likewise pass into the heart model 10.

The heart model 10 simulates the passage of an object, such as catheter 38, through the subclavian vein and the superior vena cava represented by the vein 16. As indicated above, the lubricity of the material selections provide a life-like representation. Once the lead 36 is guided into the heart structure 15, various other techniques may be illustrated or practiced. Broadly, general direction and manipulation within the heart structure 15 is achieved. This gives practitioners the ability to work in a realistic environment and also visually identify the results of various actions. In addition, specific guidance issues can be addressed. For example, assuming heart model 10 is fabricated with the appropriate anatomy, passage into and through the various chambers, encountering the various valves, entry and passage through the coronary sinus, passage through the septum, as well as other actions can be simulated.

The heart model 10 provides indications of various sites that are desirable for lead affixation (and may also include indications of undesirable locations). In one embodiment, these areas are graphically represented (e.g., colored areas, text, or other printed matter). Thus, the practitioner simply guides the lead 36 to the indicated area. In other embodiments, fixation sites are provided wherein the practitioner affixes the lead to a given location.

As illustrated in FIG. 1, the holes 20, 22, 24, 25 and 26 define specific sites for affixation. The size of the holes is variable. As illustrated, relatively small areas are defined to encourage precise positioning. Alternatively, larger areas (e.g., the lower portion of the right ventricle) may be removed, thus defining a much larger area to which the lead may be affixed.

The holes through the heart structure 15 are filled with an appropriate material in the form of plug 46 to which the lead 36 may be affixed via, e.g., helix 42. In such a case, the plug 46 has a material consistency simulative of tissue. That is, sufficient pressure can be generated via the lead 36 (and any implements used therewith) so that helix 42 pierces and bores into the plug 46. Therefore, the plug 46 will typically be "softer" than the surrounding material defining the heart structure 15. The plug 46 may be made of any suitable material including, for example, silicone, polyurethane, silicone gels or foam, polyurethane gels or foam, or various other elastomers or material having a relatively low durometer and sufficiently high tear strength. Felt pads or sponge may also be used in some embodiments, as these materials will allow for helix insertion. Preferably, the material selected will retain the helix to some degree so as to confirm proper affixation; however, there is no need to require the same strength of human tissue.

Material choices for the plug 46 that share physical properties with human tissue provide for a more realistic simulation. In addition, they may more accurately illustrate mistakes, improper techniques and confirm proper procedures. For example, if the strength of the material approximates human tissue, tugging on the lead 36 should extract the helix 42 from the plug 46 in the same circumstances as it would from human tissue. Thus, if the lead 36 is accidentally pulled backwards, the result should be simulative. Additionally, after affixation, testing the strength of the anchoring by pulling the lead 36 would also be representative of human tissue.

The plug 46 may have any desired shape or configuration such that it may be placed into or against hole 25 (or configured for any shape or size of an area). The plug 46 may simply be held against the heart structure 15. Preferably, the plug 46 is retained in some manner in or against the hole 25. Various adhesives may be employed to permanently or temporarily affix the plug 46.

Figure 2A:
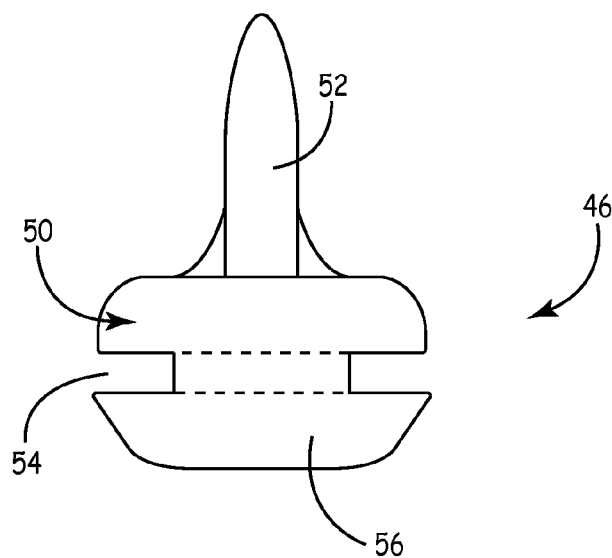
FIGS. 2A and 2B are side elevational views of plugs for inserting into the heart model to provide a lead affixation surface.
Figure 2B:
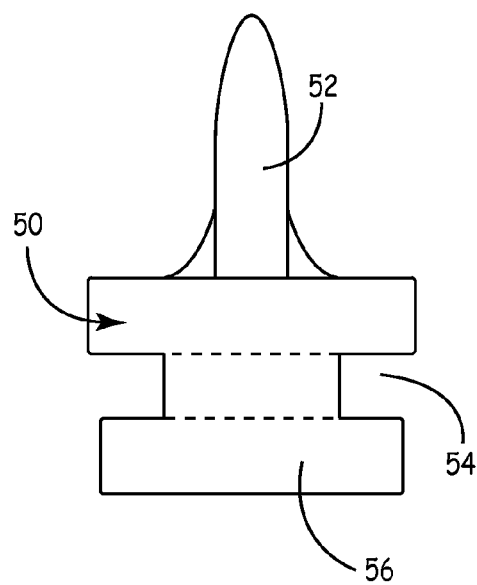

FIGS. 2A and 2B illustrate plugs 46 that have a specific shape that allows the plug 46 to be inserted into and retained within the hole 25. The plug 46 includes a body 50 and an optional dependant handle 52. A slot 54 is provided in the body 50 and engages the portion of heart structure 15 that defines the hole 25. A base 56 is provided and defines the material that will provide the attachment point for the lead 36. In FIG. 2A, the base is tapered to facilitate entry though hole 25. In FIG. 2B, the base 56 is not tapered. Because of the deformable nature of the plug 46, it may be squeezed or compressed to facilitate placement into the hole 25 and its natural resiliency will return the plug 46 to its normal configuration when released.

The plugs 46 will generally permit multiple lead attachments prior to deteriorating to a point where they are unusable. If or when the plugs 46 reach such a state, they are simply discarded and replaced. Of course, the plugs 46 may be replaced as frequently as desired including with every use. Additionally, the plugs 46 may be color coded to indicate various meanings. For example, proper site locations may have a first color, e.g., blue while improper site locations may be given a second color, e.g., red. Such visual aides may reinforce standards of practice. For example, the apex 18 of the heart has been a commonly accepted attachment point. Recent evidence suggests that this may not be the most preferred location. Thus, in use practitioners may visually identify that once proper locations are now undesirable or less preferred based of the color coding. Likewise, as new or non-traditional areas are identified as acceptable (or conversely as inappropriate or less preferred) site locations, their positive color coding will impact the practitioners.

The same or similar material used for the plugs 46 may be used for other portions as well. As indicated, larger areas may be provided for suitable attachment points and as such, the proper size and shape is fabricated. In addition, other anatomical structures may be provided such as the septum, allowing for a device to pierce therethrough and simulate other procedures. Valves and other structures may be modeled with tissue simulative material. For example, some lead anchoring techniques rely on engaging tines or barbs on an electrode within complex fibrous tissue. Such tissue may be simulated in order to allow lead affixation in this manner. The various internal structures, if provided, may have a high degree of dimensional accuracy (e.g., wall thickness) and/or responsiveness (e.g., flexibility).

The simulative material may be applied to some or all of the exterior of the heart model 10. This will provide for a more realistic feel, if desired, while retaining the rigidity and support provided by the heart structure 15. In addition, external procedures such as the affixation of epicardial leads may be simulated. Various other structures such as veins or arteries may be provided for left heart procedures. To the extent affixation occurs, the same degree of simulative possibilities as previously discussed are available. In addition, many left sided implantations rely on other anchoring techniques that take advantage of the size and/or shape of the lead relative to the vein. Thus, the modeled left sided veins may include accurate inner diameters, tortuous pathways, vein compliance, and frictional characteristics.

Although the present invention has been described with reference to preferred embodiments, persons skilled in the art will recognize that changes may be made in form and detail without departing from the spirit and scope of the invention.

The invention claimed is:

1. A heart model comprising:
 a rigid heart structure defining at least one cardiac chamber; and
 an affixation surface defining a portion of the heart structure, wherein the affixation surface is formed from a material that permits lead affixation, wherein the affixation surface is a plug retained within an opening in the heart structure.

2. The heart model of claim 1, wherein the plug is silicone.

3. The heart model of claim 1, wherein the plug comprises:
 a cylindrical base portion; and
 a slot disposed circumferentially about the base portion.

4. The heart model of claim 3, wherein the plug further comprises a dependant handle.

5. The heart model of claim 3, wherein the plug is formed from a resilient material that expands to an original state subsequent to compression.

6. The heart model of claim 1, wherein further including multiple affixation surfaces.

7. The heart model of claim 6, wherein the multiple affixation surfaces are coded to visually indicate a status.

8. A heart model comprising:
 a rigid heart structure defining at least one cardiac chamber;
 an affixation surface defining a portion of the heart structure, wherein the affixation surface is formed from a material that permits lead affixation; and
 a venous structure coupled with the heart structure, the venous structure having an internal passage that is in communication with the cardiac chamber, wherein the internal passage has increased lubricity with respect to the heart structure.

9. The heart model of claim 8, wherein the internal passageway includes a sleeve disposed within the venous structure.

10. The heart model of claim 9, wherein the sleeve is formed from expanded polytetrafluoroethylene.

11. The heart model of claim 9, wherein the sleeve is formed from a material selected from the group consisting of: polyurethane, lubricous silicone, expandable rubber coated fiberglass, and vinyl coated fiberglass.

12. The heart model of claim 8, wherein the internal passageway is coated with a lubricant.

* * * * *